(12) United States Patent
Fink et al.

(10) Patent No.: US 11,687,054 B2
(45) Date of Patent: Jun. 27, 2023

(54) METHOD FOR VERIFYING A VALUE STREAM ALONG A TRANSPORT ROUTE OR IN WAREHOUSE STOCK BY MEANS OF BLOCKCHAIN TECHNOLOGY

(71) Applicant: Endress+Hauser SE+Co. KG, Maulburg (DE)

(72) Inventors: Nikolai Fink, Aesch (CH); Michael Gunzert, Karlsruhe (DE); Dietmar Spanke, Steinen (DE); Ulrich Kaiser, Basel (DE); Dimitri Mousko, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 1097 days.

(21) Appl. No.: 16/337,657

(22) PCT Filed: Aug. 28, 2017

(86) PCT No.: PCT/EP2017/071542
§ 371 (c)(1),
(2) Date: Mar. 28, 2019

(87) PCT Pub. No.: WO2018/059854
PCT Pub. Date: Apr. 5, 2018

(65) Prior Publication Data
US 2019/0227515 A1    Jul. 25, 2019

(30) Foreign Application Priority Data
Sep. 30, 2016    (DE) .................... 10 2016 118 612.0

(51) Int. Cl.
*G06F 7/00* (2006.01)
*G05B 19/31* (2006.01)
(Continued)

(52) U.S. Cl.
CPC .......... *G05B 19/31* (2013.01); *G05B 19/0425* (2013.01); *G06Q 10/087* (2013.01);
(Continued)

(58) Field of Classification Search
CPC ................ G05B 19/31; G05B 19/0425; G05B 2219/32392; G06Q 10/087; G06Q 50/28; H04L 2012/4026
(Continued)

(56) References Cited

U.S. PATENT DOCUMENTS

2016/0012424 A1    1/2016    Simon et al.
2016/0098730 A1    4/2016    Feeney
(Continued)

FOREIGN PATENT DOCUMENTS

DE    102015114215 A1    3/2017
WO    2017067587 A1    4/2017

OTHER PUBLICATIONS

Dickson, Ben, Decentralizing IoT networks through blockchain, Jun. 28, 2016, 10 pp.
(Continued)

*Primary Examiner* — Yolanda R Cumbess
(74) *Attorney, Agent, or Firm* — Kelly J. Smith; Endress+Hauser (USA) Holding, Inc.

(57) ABSTRACT

The present disclosure relates to a method for verifying a value stream along a transport route, wherein a plurality of field devices, each having at least one sensor and/or actuator for determining and/or monitoring at least one process variable and an electronic unit, are arranged along the transport route and generate corresponding data, or for verifying the value stream of at least one product in warehouse stock, wherein a first service platform is used, via which a plurality of participant nodes each with at least one
(Continued)

database have a communication connection to one another according to a distributed ledger or blockchain technology.

8 Claims, 1 Drawing Sheet

(51) Int. Cl.
    *G06Q 10/087*    (2023.01)
    *G06Q 50/28*     (2012.01)
    *G05B 19/042*    (2006.01)
    *H04L 12/40*     (2006.01)

(52) U.S. Cl.
    CPC ... *G06Q 50/28* (2013.01); *G05B 2219/32392* (2013.01); *H04L 2012/4026* (2013.01)

(58) Field of Classification Search
    USPC .................................. 700/108–109, 112, 213
    See application file for complete search history.

(56) References Cited

U.S. PATENT DOCUMENTS

| | | |
|---|---|---|
| 2016/0253622 A1 | 9/2016 | Sriram et al. |
| 2016/0284033 A1 | 9/2016 | Winand et al. |
| 2019/0137989 A1* | 5/2019 | Cella ................ G05B 19/41875 |
| 2020/0100428 A1* | 4/2020 | Anderson .......... A01D 41/1271 |

OTHER PUBLICATIONS

Vorabutra, Jon-Amerin, Why Blockchain is a Game Changer for Supply Chain Management, https://www.loaddelivered.com/blog/why-blockchain-is-a-game-changer-for-supply-chain-management, https://web.archive.org/web/20160330173515/https://www.loaddelivered.com/blog/why-blockchain-is-a-game-changer-for-supply-chain-management/, Jan. 28, 2016, 3 pp.

Tian, Feng, An Agri-food Supply Chain Traceability System for China Based on RFID & Blockchain Technology, Vienna University of Economics and Business, Vienna, Austria, 6 pp.

* cited by examiner

METHOD FOR VERIFYING A VALUE STREAM ALONG A TRANSPORT ROUTE OR IN WAREHOUSE STOCK BY MEANS OF BLOCKCHAIN TECHNOLOGY

CROSS-REFERENCE TO RELATED APPLICATIONS

The present application is related to and claims the priority benefit of German Patent Application No. 10 2016 118 612.0, filed on Sep. 30, 2016 and International Patent Application No. PCT/EP2017/071542, filed on Aug. 28, 2017, the entire contents of which are incorporated herein by reference.

TECHNICAL FIELD

The invention relates to a method for verifying a value stream along a transport route, e.g. of a pipeline or a production line, wherein a plurality of field devices, each having at least a sensor and/or actuator for determining and/or monitoring at least one process variable, are arranged along the transport route and generate corresponding data, or for verifying the value stream of at least one product in warehouse stock. Generally speaking, the method according to the invention serves for verifying a value stream in a supply chain.

BACKGROUND

The term "value stream" in connection with the invention is understood to mean all activities, especially the material, product and information flows, services etc., that are necessary in order to manufacture and/or supply a product and/or to provide the required service. Therefore, in the instance of the production of products, for example field devices, in addition to the production activities of the manufacturer the "value stream" also includes the activities of suppliers and the activities for supplying the field devices to the customers/end customers.

In the instance of a pipeline or in a pipeline system, the value stream comprises all input and output flows of the medium that is flowing in the pipeline or the pipeline system. The free-flowing medium is especially oil, water, gas etc.

In a warehouse, the value stream comprises especially the supply and delivery of partial components of a product to be produced, and/or the delivery of the manufactured product to distributors or end customers. In connection with the invention, storage is understood to mean the storage of products, especially materials, substances, components, and end products. Storing means the intentional interruption of material flow in an operation, i.e. deliberately formed buffer stocks are created. Storage requires a storage facility, i.e. a room, a building, or an area in which goods are stored.

In general, the aforementioned application examples can be subsumed under the term "supply chain." In a supply chain, all inflows and outflows of raw materials, components, semi-finished products and end products, and information along the value-added and supply chain from raw material supplier to the end customer is recorded. The aim of supply chain management is to optimize the resources for all parties involved in the supply chain. A uniform and consistent mapping of the production flow and material flow, and of the order process from the customer order through the production order up to the supplier order, is required for this purpose.

The term "field devices" is further elucidated below. In automation systems, especially in process and factory automation systems, field devices serving to capture and/or influence process variables are frequently used. Sensors serve to capture process variables, which sensors are, for example, integrated into fill level measuring devices, flow meters, pressure and temperature measuring devices, pH redox potential meters, conductivity meters etc. which record the corresponding process variables of fill level, volume flow rate, pressure, temperature, pH value, or conductivity. Actuators, such as valves or pumps, for example, are used to influence process variables. Thus, the flow rate of a fluid in a pipeline section or a fill level in a container can be altered by means of actuators. Field devices, in general, refer to all devices which are process-oriented and which supply or process process-relevant information. In the context of the invention, field devices also refer to remote I/Os, radio adapters, or, in general, devices that are arranged at the field level. A variety of such field devices are manufactured and marketed by the Endress+Hauser company. The field devices are usually connected to a fieldbus, and the communication among the field devices and/or with a higher-level unit takes place via at least one of the fieldbus protocols that are typically used in automation technology. Furthermore, it has become known that field devices are designed to be Internet-capable. Field devices of many types are used in the determination or verification of the value stream in the aforementioned applications.

Data provided by the field devices are especially measurement data, control data, diagnostic data, status data, and/or historical data.

SUMMARY

The invention is based on the object of making a value stream verifiable in a tamper-proof manner along a transport route in a pipeline or in a production line or in warehouse stock—generally in a supply chain or in a section of a supply chain.

The object is achieved by the method described in claim 1. The method according to the invention serves for the verification of the value stream along a transport route, e.g. a pipeline or a production line, wherein a plurality of field devices, each having at least one sensor and/or actuator for determining and/or monitoring at least one process variable, are arranged along the transport route and generate corresponding data; or the method according to the invention serves for the verification of the value stream of at least one product in a supply chain or in warehouse stock, wherein a first service platform is used by means of which a plurality of participant nodes, each with at least one database, have a communication connection to one another according to a distributed ledger or blockchain technology. The method according to the invention especially includes the following method steps:

the ACTUAL data supplied by one of the field devices, or the ACTUAL data relating to the number or amount of the at least one product in the warehouse stock or in the supply chain, are transmitted in a transaction to the participant nodes of the service platform; or the ACTUAL data of one of the field devices, or the ACTUAL data relating to the amount or the number of the at least one product in the supply chain or warehouse stock, are transmitted to a participant node that transmits the ACTUAL data in a transaction to the other participant nodes (in the first instance, the data supplier is a participant node of the first service platform; in the second instance, the data supplier is not a participant node of the first service platform); wherein, in addition to the ACTUAL data, each transaction also includes a corresponding time stamp and/or corresponding location information;

the transaction is validated by the participant nodes;

a data block containing at least the one transaction is created if a predetermined number of participant nodes validates the transaction;

the created data block is transmitted to all participant nodes;

the data block is validated and verified by the participant nodes if the validation is successfully completed by a second predetermined number of participant nodes;

the validated data block is stored in each of the decentrally arranged databases of the participant nodes;

via a comparison with corresponding target data, the value stream along the measurement route or in the warehouse stock is verified, or an error message is generated.

Using ACTUAL data supplied by the field devices, compared to corresponding TARGET data, a statement is provided about the value stream in the pipeline, in the production line, in the supply chain, or in warehouse stock. In addition, an error message is generated if it is detected on the basis of the data that an unauthorized inflow or outflow of a medium (pipeline) or of a product (production line, warehouse stock, supply chain) occurs at a defined location and/or at a defined point in time. An unauthorized removal (theft) of medium from the pipeline can thus be discovered.

The validation, verification, and storage of the data in the decentrally arranged database is accomplished in a tamper-proof manner by using distributed ledger or blockchain technology. According to the invention, each change in the value stream is verified, and the individual transactions of the field devices involved in the process that take place over time are stored in a tamper-proof manner in the blockchain.

If the transport route is a pipeline, it can be traversed by various media. It can be an oil or gas pipeline, but it can also be a water line or a water distribution system. It can also be a power distribution network—with or without charging stations. In pipelines and water distribution systems, it is important to monitor whether the flow rate of the fluid medium is constant from measuring point to measuring point, or whether it decreases or increases by a predetermined amount when an extraction or supply takes place between the measuring points. The TARGET data are therefore usually provided by at least one measuring point that is positioned upstream on the transport route (as seen in the flow direction). In the event of an extraction by a customer, the extracted amount can be precisely determined. In the event of an unauthorized extraction, a corresponding warning message can be generated.

Corresponding flow meters, e.g. Coriolis flow meters or vortex flow meters, are preferably used in a pipeline for determining the flow rate. Of course, the invention is not limited to the use of said flow meters.

An advantageous development of the method according to the invention provides that the field devices or the participant nodes are integrated into a second service platform, by means of which a contract can be concluded relating to a defined delivery quantity. In addition, it is proposed that the quantity of the fluid medium delivered to a customer is paid for via the second service platform. This second service platform is preferably also configured as a distributed ledger or blockchain. Preferably, ETHEREUM or BLOCKSTREAM, for example, are used as the distributed ledger in connection with the conclusion of corresponding supply/service contracts (maintenance of a defined warehouse stock by means of supply chain management) and/or with the payment for the supplied products (water, oil, etc.) or the service rendered. The payment is preferably made via a blockchain-based currency (cryptocurrency), such as Bitcoin. Systems using distributed ledger or blockchain technology are characterized by a high degree of security. A manipulation of the data—in this instance on the transmission path from supplier or service provider to customer/end customer, or from the customer/end customer to the supplier or service provider—can therefore be reliably prevented. All changes with regard to the medium flowing through the pipeline, all changes in the product stream in a production line or in the supply chain, or all changes in warehouse stock are logged and unalterably stored.

As already mentioned, a blockchain consists of a plurality of participant nodes, wherein at least one database is integrated into each participant node. The data transmitted by the field devices are stored in the decentralized databases in a tamper-proof manner. It is especially provided in this context that computing units/computers of one or more user(s) or service provider(s) and/or electronic units of field devices are realized as participant nodes. According to one advantageous embodiment of the method according to the invention, it is proposed that a participant node is designed either as a full node version or as a light node version.

As was already stated, it is preferably provided that the payment for the supply of a medium/a product, or for a service, take place via ETHEREUM or Blockstream. This is also an application of blockchain technology or distributed ledger technology. ETHEREUM or Blockstream manage assets, and/or govern the accesses or the transfers of assets. It is also possible to conclude contracts via distributed ledger technologies, e.g. by using smart contracts, and/or to execute the payment for the supply quantities or services provided according to the contract.

According to an advantageous embodiment of the method according to the invention, it is provided that the comparison of ACTUAL data and TARGET data for the purpose of verifying the value stream is alternatively also carried out directly on a smart phone, a tablet, or a portable operator tool outside of the distributed ledger or the blockchain. For this purpose, the corresponding comparison data or the APPs are made available by the manufacturer or by a service provider on request, where applicable again via the distributed ledger or blockchain.

BRIEF DESCRIPTION OF THE DRAWINGS

The invention is explained in greater detail with reference to the following Figures. These show.

DETAILED DESCRIPTION

Figure 1:
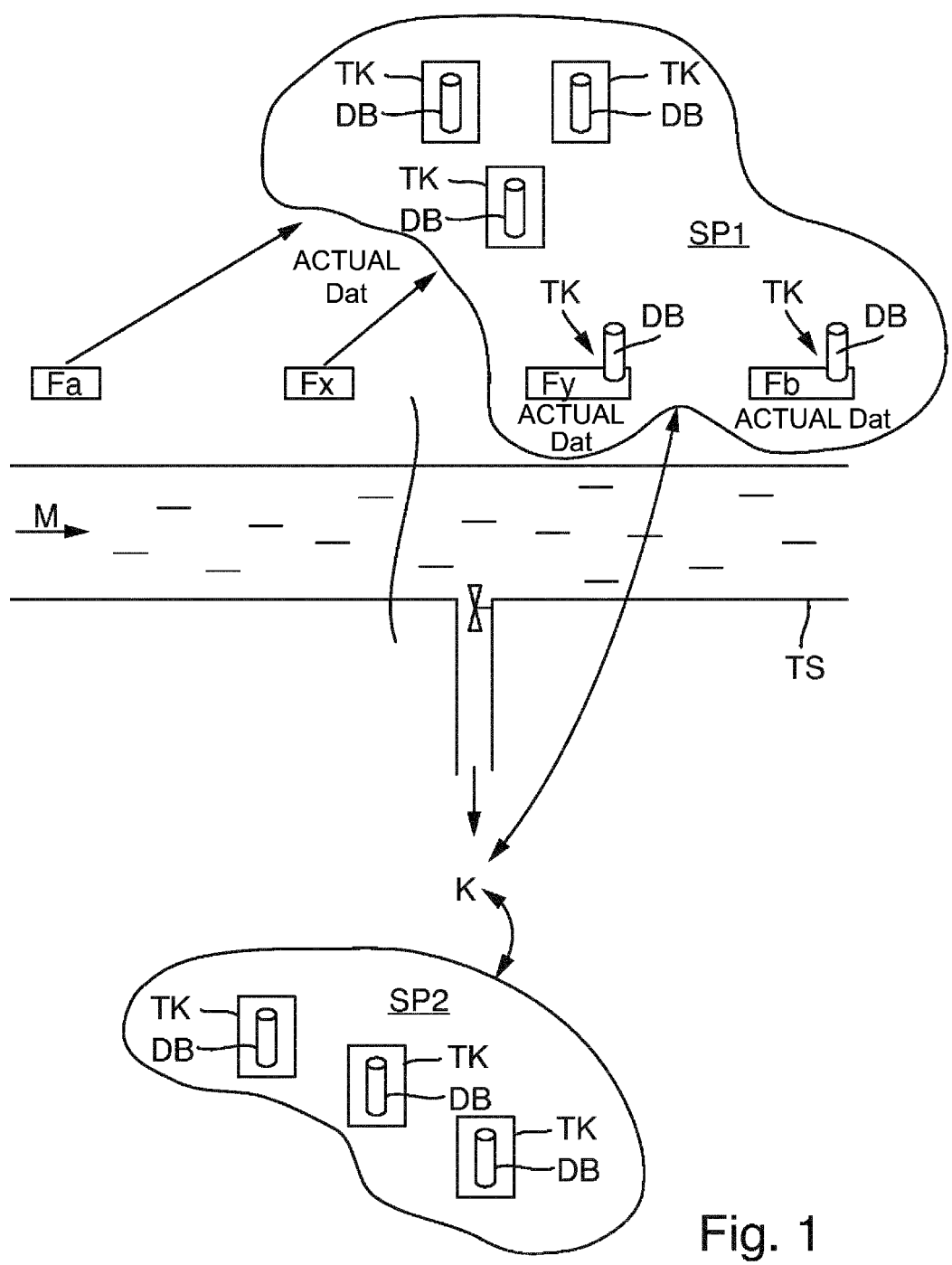
FIG. 1 shows a schematic representation of a transport route, according to an embodiment of the present disclosure.

FIG. 1: a schematic representation of a transport route TS, in this instance a pipeline, in which the verification of the value stream, i.e. of the fluid medium M flowing in the pipeline, is operated according to the invention. A plurality of field devices F, the field devices F especially being flow meters, is arranged along the pipeline and determine, for example, the mass flow of the medium M flowing in the pipeline. The pipeline may extend over hundreds or thousands of kilometers, e. g., from Russia into the Ukraine or to Europe. It is inherently understood that, as an alternative or in addition to the determination of the mass flow, the composition/quality of the flowing medium M may also be monitored, for example.

At defined time intervals, the field devices F provide measured values ACTUAL DAT relating to the mass flow of the medium M in the pipeline. Thus, by comparing the ACTUAL data ACTUAL DAT from two field devices Fx, Fy arranged adjacent to one another, it can be detected whether a change in the mass flow has taken place in the section between the two field devices Fx, Fy. The ACTUAL data ACTUAL DAT of the field devices F are always provided with a time stamp and/or a location information.

The two field devices Fy, Fb arranged on the right are designed as participant nodes TK of a service platform SP1 based on the distributed ledger or blockchain technology. The field devices Fy, Fb transmit the ACTUAL data ACTUAL DAT in a respective transaction to all participant nodes TK of the first service platform SP1. The two field devices Fa, Fx arranged to the left are not participant nodes of the first service platform SP1. Their ACTUAL data ACTUAL DAT are transmitted, for example in encrypted form via the Internet, to a participant node TK which transmits the ACTUAL data ACTUAL DAT in a respective transaction to all participant nodes TK of the first service platform SP1.

Brief additional note: A blockchain itself is made up of a series of data blocks in which one or more respective transactions are combined and provided with a checksum. Each transaction includes at least a portion of a data set, in this instance preferably the ACTUAL data of one of the field devices F. The integrity of the data, thus the security of the data against subsequent tampering, is ensured by the storage of the cryptographic checksums of the preceding data block in each subsequent data block. New data blocks are created in a computationally intensive process called mining. For this purpose, the participant nodes TK are at least partially equipped with a corresponding computing unit. The data block is then transmitted to all participant nodes TK. Data stored in the blockchain can subsequently no longer be changed or removed; they are stored in a tamper-proof manner.

The method according to the invention is described below in detail in the case of the pipeline: In a subsequent method step, each transaction of ACTUAL data ACTUAL DAT is validated by the participant nodes TK and stored in the database DB of each participant node TK. A data block containing at least one transaction is created only if a predetermined number of participant nodes TK has validated the transaction or transactions. The data block is then transmitted to all participant nodes TK. If the data block is successfully validated by a predetermined number of participant nodes TK, it is verified. The validated/verified data block is stored in the databases DB of the decentrally arranged participant nodes TK.

The mass flow of the medium M along the pipeline is verified via a comparison with corresponding TARGET data TARGET DAT. If no extraction or no supply of medium M takes place on the transport route TS, the ACTUAL data ACTUAL DAT of the field devices F must indicate the same mass flow within the tolerance limits. In this case, there is only one TARGET value TARGET DAT. If deviations occur between the ACTUAL data ACTUAL DAT and the TARGET data TARGET DAT, this is an indication of an irregularity, e.g. an unauthorized extraction or supply of medium M.

If an unauthorized extraction by a customer K occurs on the transport route TS, the amount of the extracted medium can be determined by comparison of the ACTUAL data ACTUAL DAT of the two field devices Fx, Fy and be registered in a tamper-proof manner. The traceability of any transactions in the "pipeline" supply chain is ensured. Providing a defined amount of a medium M is fully transparent and traceable for the customer C to whom the medium was made available. Due to the security against tampering that is provided by the publication of the transactions (delivery document relating to the extracted amount of the medium, invoice document) in the area surrounding the pipeline, the customer K has full confidence in the information and actions made available from the supply change.

Ordering and payment are especially performed via a second service platform SP2, which is also based on the distributed ledger or blockchain technology. The second service platform SP2 is, for example, ETHEREUM or BLOCKSTREAM. Assets are managed and/or accesses to or transfers of assets are governed via the second service platform SP2. The conclusion of a contract or a one-time ordering of a product especially takes place via the second service platform SP2. Smart contracts are preferably used for this purpose. Furthermore, it can be provided that the payment for the products/information provided according to the order or contract is handled via the second service platform SP2. It goes without saying that the payment for a supplied product or information can also take place in a conventional manner via a bank.

A further example, not explicitly illustrated, is the stock of oil in a refinery. In this instance as well, the ACTUAL data ACTUAL DAT is continuously stored in a blockchain. Via the measured values of field devices, which determine the fill level in a tank, for example, any change in stock can be calculated directly and recorded in a tamper-proof manner in a first service platform SP1. If a customer K purchases a partial quantity of the oil stock, transactions for the order and payment are preferably made via a second service platform SP2. Only the producer and the administrator of the measurement point have any influence on the data ACTUAL DAT stored in the first service platform SP1.

The invention claimed is:

1. A method for verifying a value stream of process variables of at least one product traveling along a transport route, the transport route comprising:
 a plurality of field devices, each field device having:
  at least one sensor or actuator for determining or monitoring at least one process variable, and
  an electronic unit,
 the plurality of field devices are arranged along the transport route and generate corresponding data based on the determining or monitoring steps, or the plurality of field devices verify a value stream of at least one product in warehouse stock,
 wherein a first service platform having a plurality of participant nodes is used and the plurality of participant nodes, each with a database, have a communication connection to one another according to a distributed ledger or blockchain technology, wherein the method includes the following method steps:
 supplying the value stream of ACTUAL data by the field devices;
  1) transmitting the ACTUAL data supplied by one of the field devices, or ACTUAL data relating to the quantity of the at least one product in warehouse stock, in a transaction to the participant nodes of the first service platform; or
  2) transmitting the ACTUAL data supplied by one of the field devices, or the ACTUAL data relating to the quantity of the at least one product in warehouse stock, to one of the participant nodes that transmits the ACTUAL data in the transaction to the participant nodes of the first service platform;

providing the transaction of ACTUAL data with a corresponding time stamp or corresponding location information;

validating the transaction by the participant nodes;

creating a data block containing the transaction if a predetermined number of participant nodes validate the transaction;

transmitting the data block to all participant nodes;

validating the data block by the participant nodes; and verifying if the validation is successfully completed by a second predetermined number of participant nodes;

storing the validated data block in the databases of participant nodes; and verifying the value stream along the transport route by comparing the ACTUAL data of the value stream supplied by the field devices with the corresponding TARGET value of the value stream; and generating an error message if the value stream cannot be verified.

2. The method of claim 1, wherein a statement about the value stream on the transport route or in warehouse stock is provided based on the ACTUAL data supplied by the field devices, or an error message is generated if, based on the ACTUAL data, it is recognized that an unauthorized change in the value stream occurs.

3. The method of claim 1, wherein, based on the ACTUAL data of the field devices, information relating to a decrease or increase in the value stream or in warehouse stock is made available at a defined point in time at corresponding positions of the field devices in a pipeline, a production line, or in warehouse stock.

4. The method of claim 3, wherein the field devices or the participant nodes are integrated into a second service platform, wherein a payment corresponding to the decrease or increase in the value stream is initiated using the second service platform.

5. The method of claim 4, wherein the payment takes place using a cryptocurrency.

6. The method of claim 1, wherein a fluid medium flows through a pipeline, and wherein a flow rate or a flow quantity is determined by the field devices in order to determine the flow rate.

7. The method of claim 1, wherein the field devices or the participant nodes are integrated into a second service platform, wherein an order takes place via the second service platform, and wherein the order causes a change in the value stream or in the warehouse stock.

8. The method of claim 7, wherein ETHEREUM or Blockstream is used as the second service platform.

* * * * *